(12) United States Patent
Fawzi et al.

(10) Patent No.: US 8,141,236 B2
(45) Date of Patent: Mar. 27, 2012

(54) GANGED REMOVAL OF COMPONENT DEVICE COVER SCREWS

(75) Inventors: Khaled M. Fawzi, San Jose, CA (US); Chandrasekaran Nagappan, Singapore (SG)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1129 days.

(21) Appl. No.: 12/004,666

(22) Filed: Dec. 19, 2007

(65) Prior Publication Data
US 2009/0158574 A1 Jun. 25, 2009

(51) Int. Cl.
*B23P 21/00* (2006.01)
*B23Q 7/00* (2006.01)

(52) U.S. Cl. ............... 29/709; 29/711; 29/714; 29/764; 29/426.1; 29/284; 81/436; 81/57.22

(58) Field of Classification Search ............... 29/426.1, 29/525.11, 709, 711, 714, 762, 764, 284, 29/426.5, 700, 603.02, 256; 7/164; 81/436, 81/53.2, 567, 57, 57.22, 57.36, 56
See application file for complete search history.

(56) References Cited

U.S. PATENT DOCUMENTS

| | | | |
|---|---|---|---|
| 3,864,805 A | 2/1975 | Klukos | |
| 4,375,772 A | 3/1983 | Brackett et al. | |
| 4,627,316 A | 12/1986 | Mori et al. | |
| 4,924,732 A | 5/1990 | Hoskins et al. | |
| 5,014,876 A | 5/1991 | Young et al. | |
| 5,101,697 A | 4/1992 | Fishback | |
| 5,123,158 A | 6/1992 | Dixon | |
| 6,205,004 B1 | 3/2001 | Kim | |
| 6,289,774 B1 | 9/2001 | Soderlund | |
| 6,543,119 B2 | 4/2003 | Jenkins et al. | |
| 6,571,179 B2* | 5/2003 | Siegel | 702/33 |
| 6,646,872 B1 | 11/2003 | Chen | |
| 6,646,892 B1 | 11/2003 | Hsu | |
| 6,931,706 B2 | 8/2005 | McTague et al. | |
| 7,178,432 B1 | 2/2007 | Han et al. | |
| 2006/0179633 A1 | 8/2006 | Chan et al. | |

FOREIGN PATENT DOCUMENTS

JP 64020939 1/1989

OTHER PUBLICATIONS

Peterson, et al., "Development of an Automated Screwdriver for Use with Industrial Robots", *IEEE Journal of Robotics and Automation*, vol. 4, No. 4, (Aug. 1988),411-414.
Zongming, et al., "A New Type of Automatic Tool Exchanger and Automated Screwdriver For Use in Industrial Robots", *IEEE Journal*, (1991),856-858.
Assembly and Automation Tech,Inc, et al., "Automatic Screwdriver: For Small Part Assembly", *Assembly & Automation Technology, Inc.*, (Dec. 2002),1-4.
Diaz, et al., "Automatic Cooperative Disassembly Robotic System", (2005),1.

* cited by examiner

*Primary Examiner* — Jermie Cozart (57) ABSTRACT

An apparatus for removal of retentive mechanisms retaining a cover of a component device. The apparatus includes a structure. The apparatus also includes a component device positioner coupled to the structure. The apparatus additionally includes a plurality of retentive mechanism removers coupled with the structure. Each of the plurality of retentive mechanism removers are configured for interoperability with each retention mechanism retaining a cover of a component device having a plurality of retention mechanisms disposed therein. The apparatus further includes a drive mechanism that is coupled with the structure. The drive mechanism is for rotation of each of the plurality of retentive mechanism removers, causing removal of each retention mechanism retaining the cover of the component device.

12 Claims, 9 Drawing Sheets

GANGED REMOVAL OF COMPONENT DEVICE COVER SCREWS

TECHNICAL FIELD

The invention relates to the field of device cover removal.

BACKGROUND ART

Many electronic consumer products, e.g., computer systems, various other entertainment devices, electronic communication devices, etc., have numerous electronic devices and components disposed therewithin. Functions performed by the various components can include, but is not limited to, document manipulation, printing and data storage, video and audio playback, communication functions, etc.

For example, a computer system or other electronic system utilizing a hard disk drive that includes, in part, magnetic hard disk(s) or drive(s) within an outer housing or base containing a spindle motor assembly having a central drive hub that rotates the disk. There is a mated cover that is configured to align with and be mounted to the outer housing, via one or more screws or other retentive devices or mechanisms, thereby providing a sealed environment for the internal components in a hard disk drive.

There are varied instances when internal access of a hard disk drive is required, e.g., for repair, for data recovery, for failure analysis or other reason. Accordingly, a cover removal process is performed for accessing those components internal of a hard disk drive. During removal of the cover, screws or other retentive devices and contaminants around the retentive device regions are removed. A commonly implemented method for cover screw removal and contaminant removal is operator performed vacuuming and single screw removal. An electric screwdriver is commonly used by the operator to remove the screws.

SUMMARY OF THE INVENTION

A system and method for ganged removal of a device's cover screws are described.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Although embodiments of the present invention will be described in conjunction with hard disk drive cover removal, it is understood that the embodiments described herein are useful outside of the art of hard disk drives, such as other electronic devices that require repairing, component upgrading, data recovery, and failure analysis, A ganged cover screw removal process, as applied to a hard disk drive, is an example of embodiments of the present invention and is provided herein merely for purposes of brevity and clarity.

Figure 1:
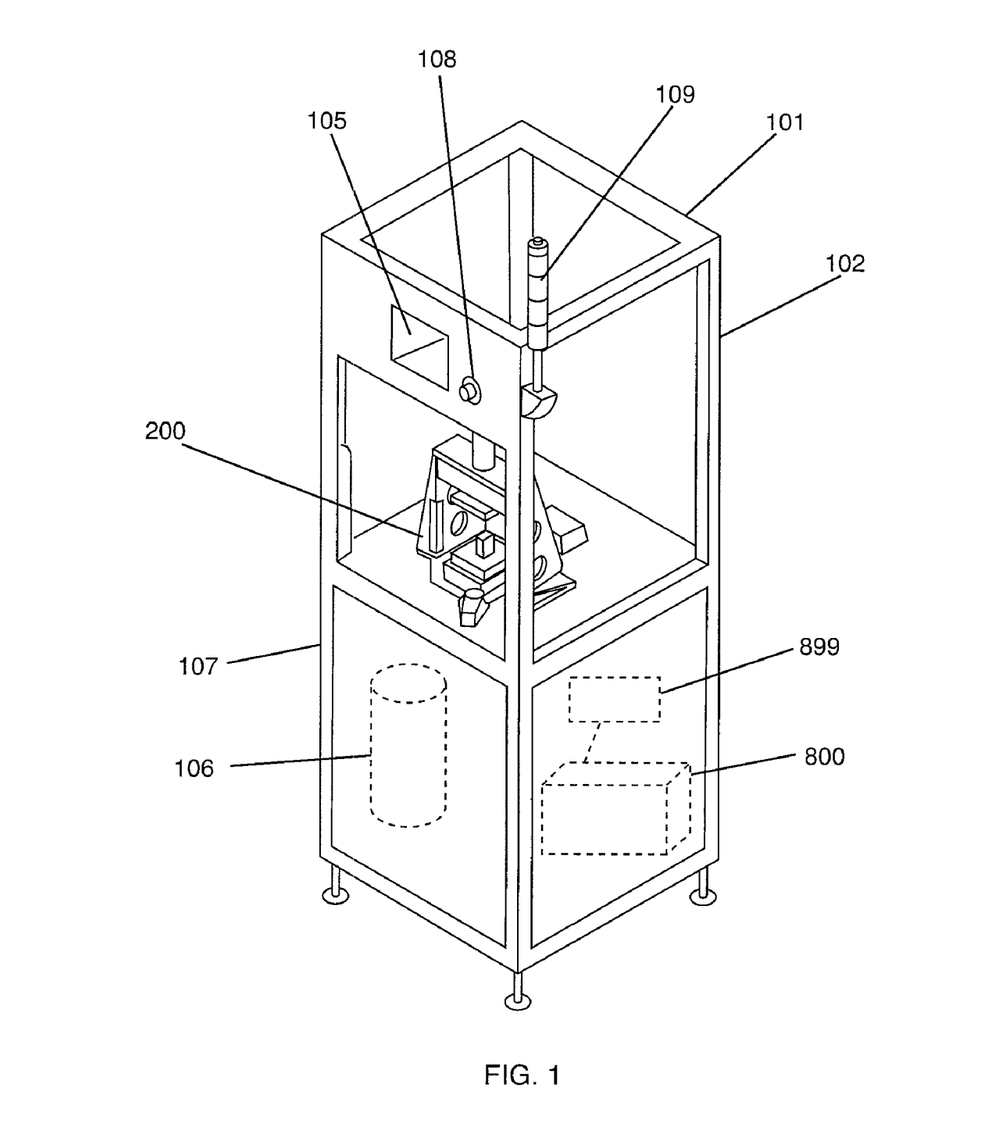
FIG. 1 is an illustrated view of a system for cover screw removal in accordance with embodiments of the present invention.

FIG. 1 is a diagram of a system 100 for component cover screw removal, in accordance with embodiments of the present invention. In an embodiment of the present invention, system 100 is configured to provide cover screw removal of a cover of a hard disk drive (HDD), e.g., screws 706 of HDD 710 of FIG. 7. System 100 is further configured to provide synchronous removal of the cover screws, in an embodiment of the present invention. System 100 is additionally configured to provide for contaminant removal during the cover screw removal process, in an embodiment of the present invention.

System 100 is shown to include a housing 101 in which components, devices and mechanisms of embodiments of the present invention are contained. Housing 101 includes an upper portion 102 and a lower portion 107. In an embodiment of the present invention, upper portion 102 includes a screw removal initiating mechanism, e.g., start button 108, that is activated to initiate a screw removal process in accordance with embodiments of the present invention. In an embodiment of the present invention, upper portion 102 further includes a lever 109. Lever 109 is utilized to place a hard disk drive in a cover screw removal position and upon which a cover removal process is to be performed thereon, in accordance with embodiments of the present invention. In an embodiment of the present invention, upper portion 102 may optionally include a display screen, e.g., touch screen 107, as described herein with reference to FIG. 8.

In an embodiment of the present invention, system 100 further includes an apparatus 200 for synchronous cover screw removal, as described herein with reference to FIGS. 2, 3, 4, 5 and 6.

In an embodiment of the present invention, lower portion 107 is configured to provide an enclosure for sub-mechanisms, power access, controlling devices and computer systems for operable control of system 100 during cover screw removal processes. In an embodiment of the present invention, lower portion 107 of housing 101 has disposed therein a computer system for controlling removal of cover screws, e.g., computer system 800 as described herein with reference to FIG. 8. In an alternative embodiment of the present invention, computer system 800 may have coupled thereto a scanner 899, as described herein with reference to FIGS. 8 and 9.

Still referring to FIG. 1, lower portion 107 is also shown to have contained therein a contaminant retriever for removing and containing particulate matter during the cover screw removal process, e.g., vacuum system 106, in an embodiment of the present invention. Vacuum system 106 is coupled with each of a plurality of cover screw removers, e.g., bit drivers 406 of FIGS. 3, 4, 5 and FIGS. 6A-6C, via a series of vacuum ports, e.g., vacuum ports 426 of FIGS. 3-5, vacuum hoses (not shown) interspersed within system 100, and openings 466 in bit drivers 406, as shown in FIGS. 6A-6C. Each of the bit drivers 406 are configured with an opening 466 for coupling with vacuum system 106, in an embodiment of the present invention. Although computer system 800 and vacuum 106 are shown internal of system 100, in alternative embodiments, computer system 800 and/or vacuum 106 may be disposed external of system 100.

Figure 2:
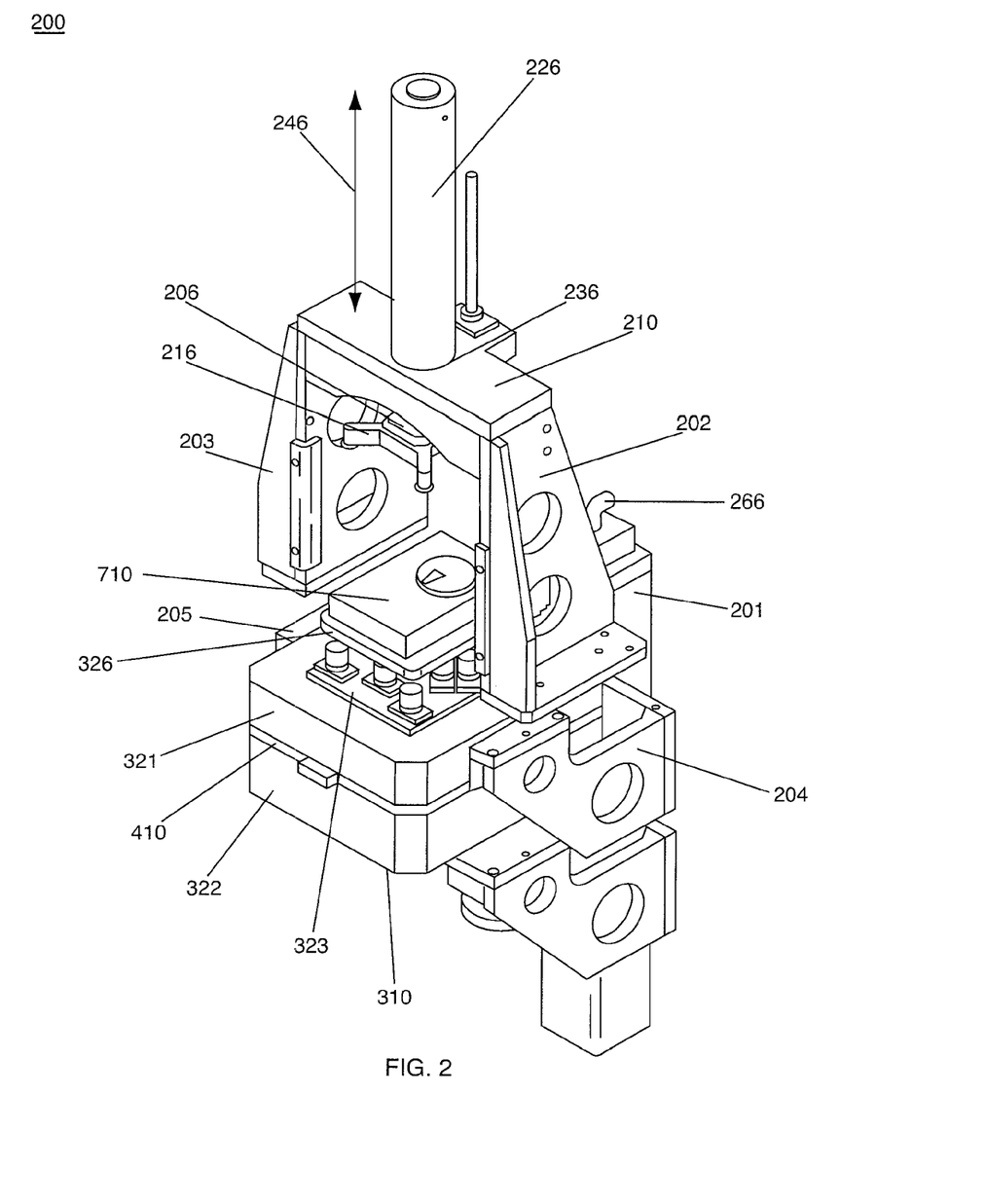
FIG. 2 is an expanded plan view of the screw removal system of FIG. 1, in an embodiment of the present invention.

FIG. 2 is an expanded view of assembly 200 of system 100 of FIG. 1. Assembly 200 is shown to include a center assembly 201 for providing mounting with system 100, in an embodiment of the present invention. Assembly 200 also includes an upper side assembly 202 and an upper side assembly 203 coupled with center assembly 201, in an embodiment of the present invention. An upper top assembly 210 is shown coupled with upper side assemblies 202 and 203, in an embodiment of the present invention.

Upper top assembly 210 is shown to include an opening 236. Assembly 200 further includes a mechanism, e.g., shaft 226, for retaining and loading an HDD into a cover screw removal position, in an embodiment of the present invention. Shaft 226, configured for vertical motion via opening 236, as indicated by arrow 246, is shown to include a component receiver, e.g., nest 206. Nest 206 includes a retention bracket, e.g., nest bracket 216 for receiving and retaining a hard disk drive, e.g., hard disk drive 710 of FIG. 7, upon which a cover screw removal process is to be performed, in an embodiment of the present invention.

In an embodiment of the present invention, nest bracket 216 is a fixed bracket singularly configured for retention of a hard disk drive model. In an alternative embodiment of the present invention, nest bracket 216 can be a variable adjust nest bracket (not shown) configured to adapt to a variety of models of hard disk drives while providing analogous retaining and positioning functions.

Assembly 200 further includes a lower side assembly 204 and a lower side assembly 205 coupled with center assembly 201, in an embodiment of the present invention. Lower side assemblies 204 and 205 are configured so as to provide interposed mounting of a cover screw removal assembly there between, e.g., cover screw removal assembly 310, as described herein with reference to FIGS. 3-5, and 6A-C, in accordance with embodiments of the present invention.

Assembly 200 of FIG. 2 further includes a bit driver assembly 310. In an embodiment of the present invention, bit driver assembly 310 is comprised of an upper housing portion 321 and a lower housing portion 322 having interposed there between a driver head assembly platform 410, as described with reference to FIGS. 3, 4 and 5. In an embodiment, assembly 310 further includes a driver head assembly cover 326 that is configured to be lowered onto disposed above as described herein with reference to FIG. 3.

Figure 3:
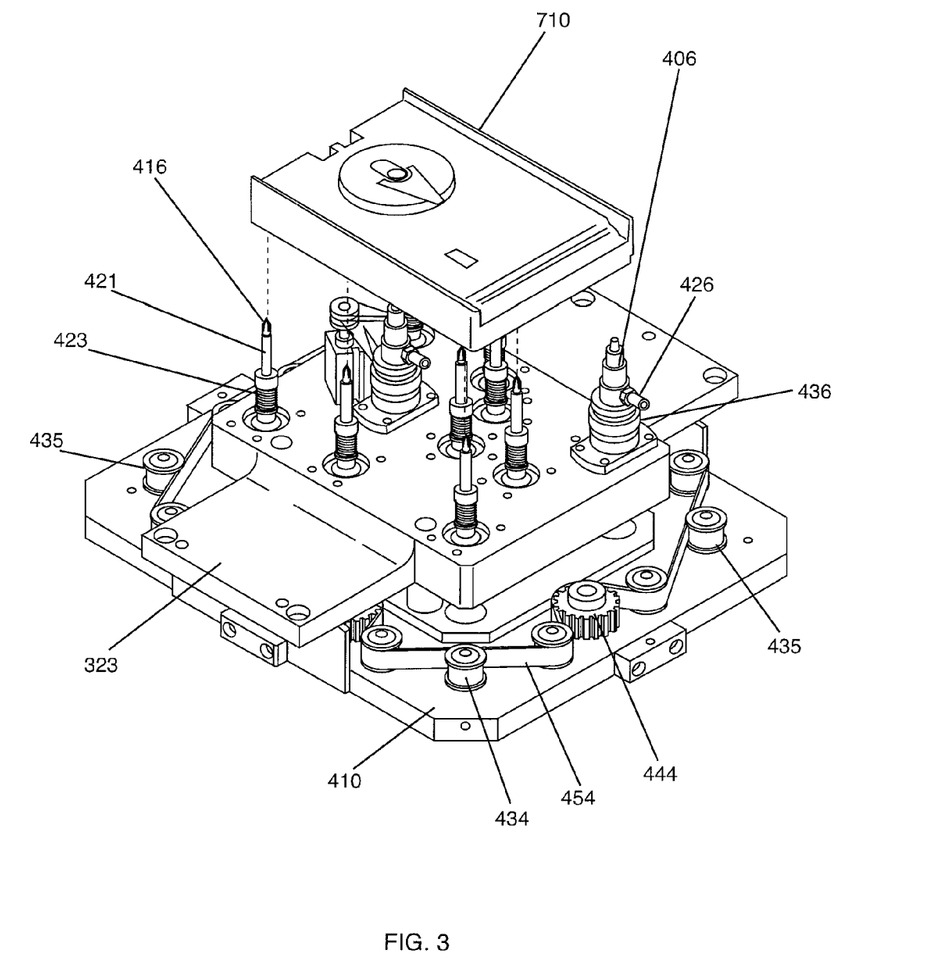
FIG. 3 is an expanded plan view of a portion of the components of FIG. 2, in an embodiment of the present invention.

Referring to FIG. 3, shown is hard disk drive 710 generally oriented relative to bit driver assembly 310 and in which upper housing portion 321 and lower housing portion 322 are not shown. In an embodiment of the present invention, assembly 310 is shown to include driver head assembly platform 410 to which is coupled a plurality of bit drivers 406.

In an embodiment of the present invention, a bit driver 406 includes a bit driver sleeve 436 within which is disposed a bit driver shaft 421 having at an end a bit driver tip 416 and around which is disposed a bit load spring 423. In an embodiment of the present invention, bit driver 406 has interposed between bit driver sleeve 436 and bit driver shaft 421 an opening 466 allowing air to flow from bit driver tip 416 to vacuum system 106 enabling vacuum system 106 to retrieve contaminants that may be locally present on a hard disk drive 710, e.g., areas proximal to a cover screw location. In an embodiment of the present invention, each bit driver 406 is configured with a vacuum port 426 enabling coupling with vacuum system 106. In an embodiment of the present invention, tip 416 is mated for use with an associated cover screw head type, as described herein with reference to FIGS. 6A-6C.

Bit driver assembly platform 410 also includes one or more drive belt sprockets 444 and a plurality of fixed drive belt rollers 434 and adjustable drive belt rollers 435. Adjustable drive belt rollers 435 provide tension adjustment for a drive belt 454. Drive belt 454 is serpentinely routed about rollers 434 and 435 and engages sprocket 444 to rotate each bit driver 406, in an embodiment of the present invention.

Figure 4:
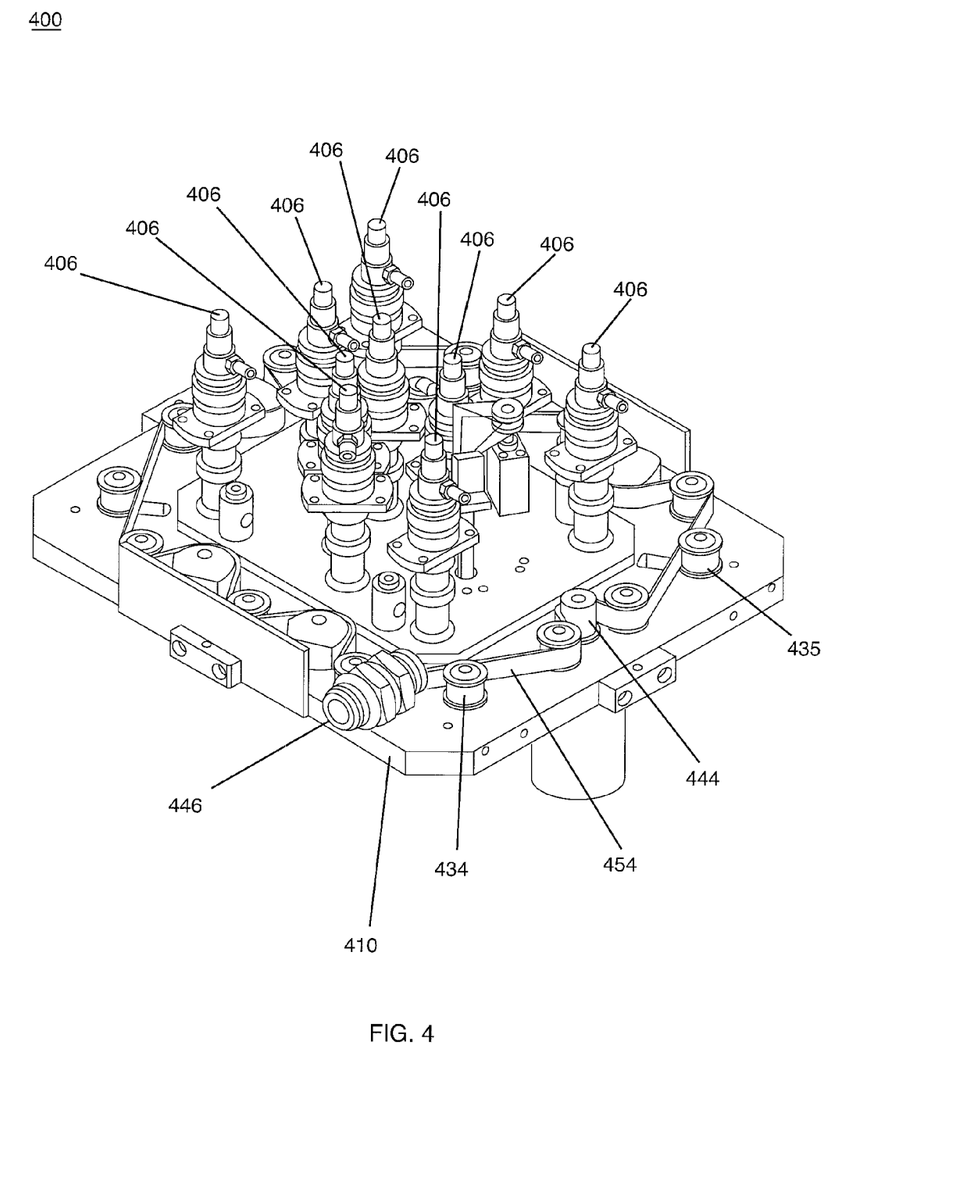
FIG. 4 is an expanded plan view of a portion of the components shown in FIG. 3, in an embodiment of the present invention.

FIG. 4 is an illustration of bit driver assembly platform 410 showing placement and orientation of bit drivers 406 in accordance with embodiments of the present invention. Platform 410 is shown to include a plurality of bit drivers 406 coupled thereto.

In the embodiment shown, ten bit drivers 406 are included. It is noted that in alternative embodiments, a fewer number of bit drivers or a greater number of bit drivers may be present. In an embodiment of the present invention, the number of bit drivers is analogous to the number of cover screws that are to be removed. In an alternative embodiment, there may be a greater number of bit drivers than cover screws present on the hard disk drive upon which a cover screw removed is to be performed. In the alternative embodiment, bit drivers 406 may be selectively rotated, such that those bit drivers 406 having an associated cover screw 706 that it is to remove are rotated while non-associated bit drivers 406 remain still.

Still referring to FIG. 4, in an embodiment of the present invention, bit driver assembly platform 410 is shown to include a vacuum port 446 for coupling vacuum system 106 to each bit driver 406 in bit drive assembly 310.

Figure 5:
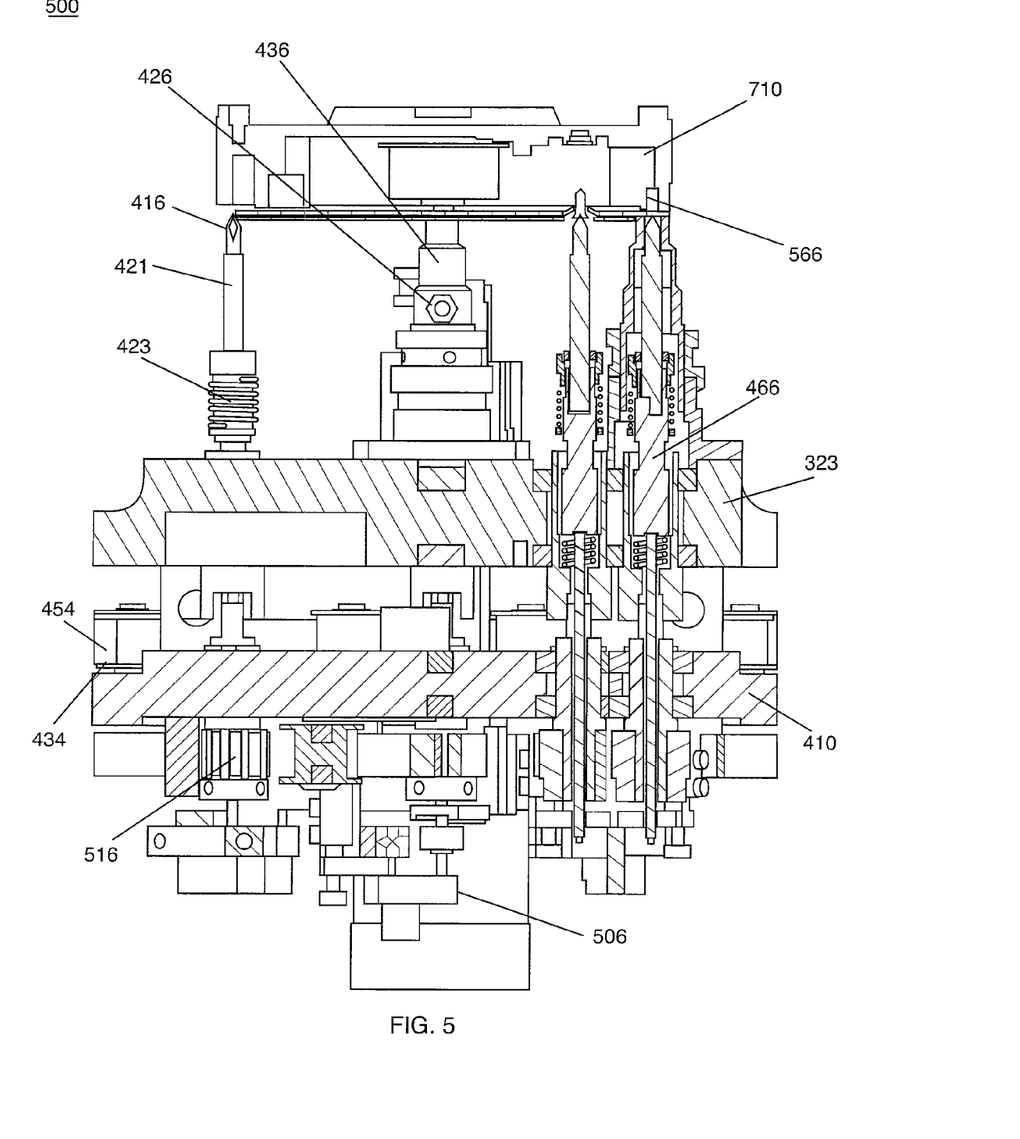
FIG. 5 is an isometric view of the components shown in FIG. 4, in an embodiment of the present invention.
Figure 6A:
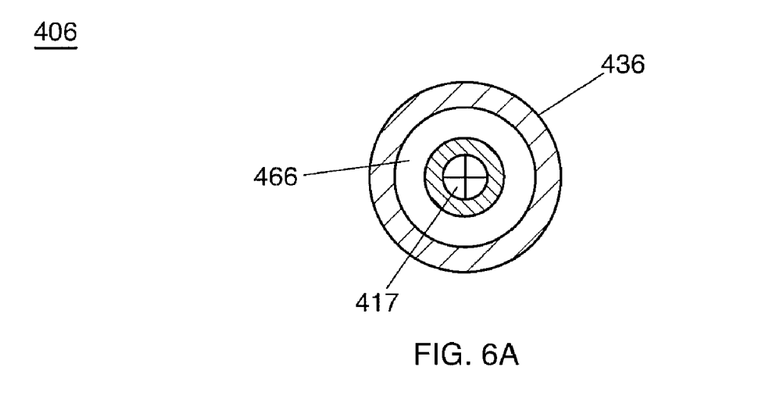
FIG. 6A is a top down view of a Phillips-head driver utilized in an automated screwdriver in accordance with embodiments of the present invention
Figure 6B:
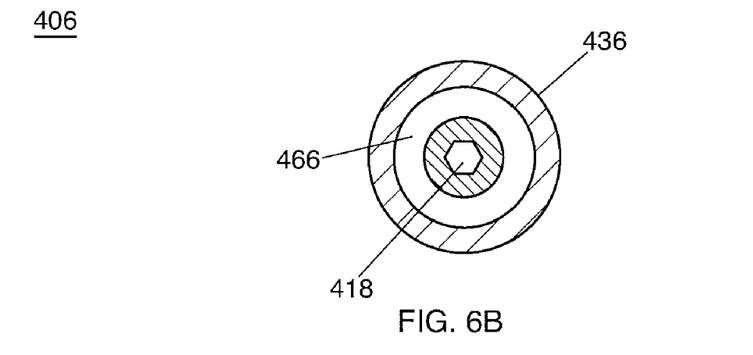
FIG. 6B is a top view of a hex head driver utilized in an automated screwdriver in accordance with an embodiment of the present invention.
Figure 6C:
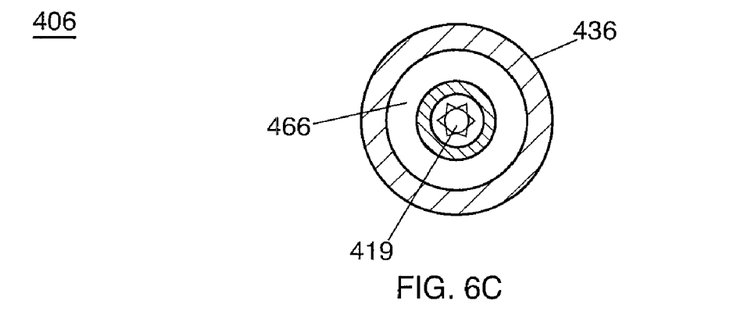
FIG. 6C is a top view of a torx head driver utilized in an automated screwdriver in accordance with an embodiment of the present invention.

FIG. 5 is a cross-section view of a bit driver 406 of bit driver assembly 310 as shown in FIGS. 3 and 4. Bit driver assembly 310 is shown without upper housing 321 or lower housing 322. Shown are bit driver platform assembly 410 and bit driver assembly platform cover 323. Drive belt roller 434 and drive belt 454 are also shown. In an embodiment of the present invention, bit driver 406 is shown to include a bit driver tip 416, a bit drive shaft 421, a bit load spring 423, an outer sleeve 436, and an opening 466, as described herein with reference to FIGS. 2-4 and FIGS. 6A-6C.

In an embodiment of the present invention, shown is a bit sensor 506 that is coupled with each bit driver 406 and for sensing contact and engagement of a bit driver tip 416 with a cover screw 706 of a hard disk drive 710. In an alternative embodiment, there may be a plurality of sensors 506 implemented.

Referring to FIGS. 6A-6C, shown is a bit driver 406 that may be configured with various drive bit tips for utilization in conjunction with processes in accordance with embodiments of the present invention. Collectively, FIGS. 6A-6C is an above view of bit driver 406 of FIGS. 2-5. Bit driver 406 is shown to include bit driver shaft 421 and an outer casing 436 in which bit driver shaft 421 is disposed. Shown interposed between outer casing 436 and bit driver shaft 421 is an opening, e.g., opening 466, oriented parallel relative to the vertical axis of bit driver shaft 421. It is particularly noted that in an embodiment of the present invention, opening 466 provides a viaduct to vacuum port 426 and through which particulate matter may be retrieved and retained by vacuum system 106 of FIG. 1.

Referring singularly to FIG. 6A, in the present embodiment, bit driver 406 is shown to be configured with a drive bit tip 417. Drive bit tip 417 enables interoperability with Phillips-head cover screws.

Referring singularly to FIG. 6B, in the present embodiment, bit driver 406 is shown to be configured with a drive bit tip 418. Drive bit tip 418 enables interoperability with hex-head cover screws.

Referring singularly to FIG. 6C, in the present embodiment, bit driver 406 is shown to be configured with a drive bit tip 419. Drive bit tip 419 enables interoperability with torx-head cover screws.

Referring collectively to FIGS. 6A-6C, although three examples of driver bit tips are shown, they are exemplary in nature and the examples should not be construed as a limitation. To accommodate the numerous types of cover screw types and configurations, bit driver 406 may be configured to include driver bit tip interchangeability.

Figure 7:
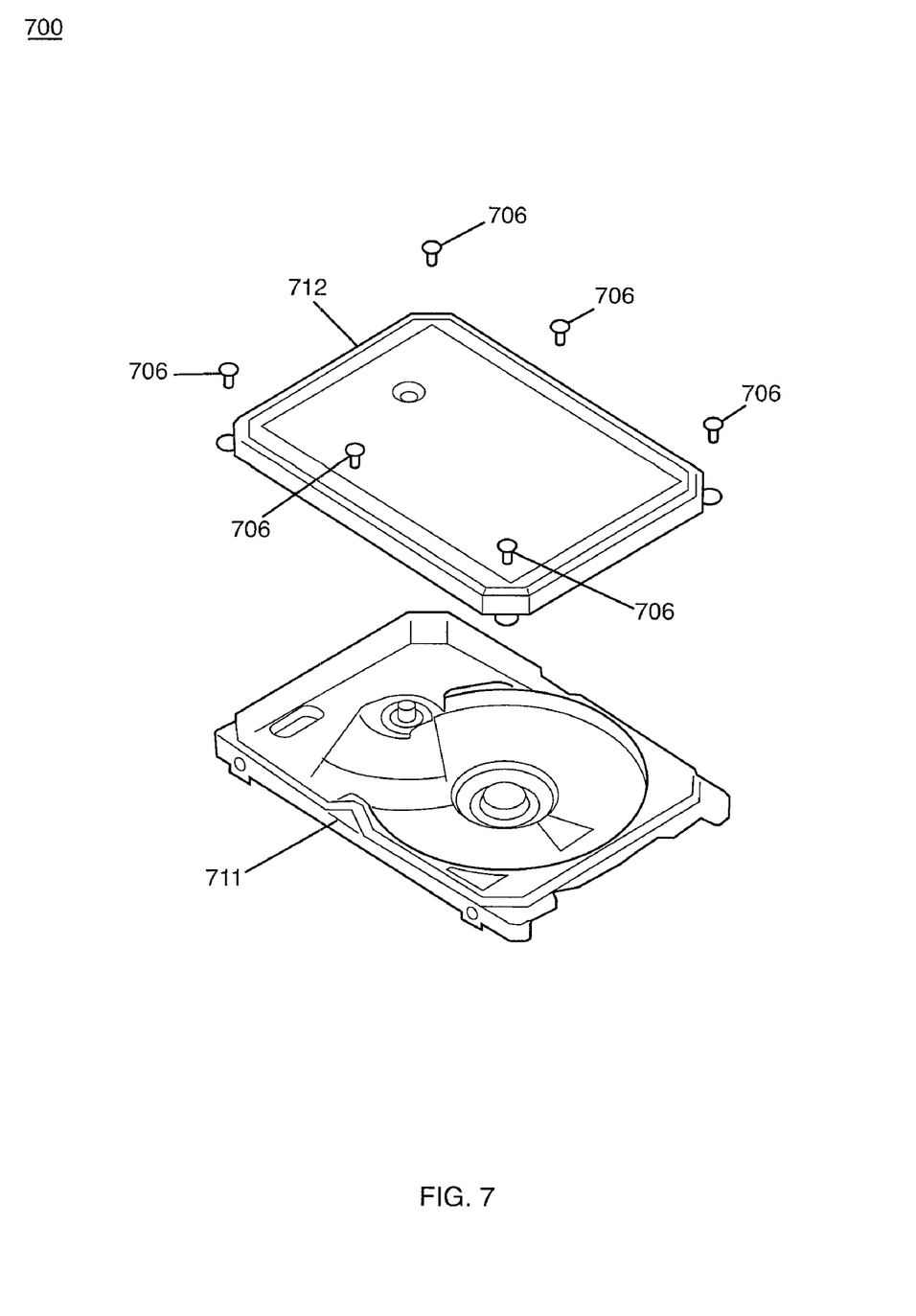
FIG. 7 is a plan view of a hard disk drive (HDD) upon which embodiments of the present invention may be practiced.

With reference now to FIG. 7, shown is a hard disk drive 710 upon which a process for cover screw removal is to be performed in accordance with embodiments of the present invention. Hard disk drive 710 is shown to include an outer housing 711 in which the internal workings of a hard disk drive are disposed. Hard disk drive 710 further includes a cover portion 712 that is appropriately configured (mated) for disposition upon outer housing 711, such that when cover 712 is in place, a sealed HDD exists.

Hard disk drive 710 further includes a plurality of cover screws 706 for securely fastening cover portion 712 to outer housing 711. It is upon cover screws 706 that embodiments of the present invention are practiced, as described herein with reference to FIGS. 1-5, 6A-C, and FIGS. 8 and 9.

Figure 8:
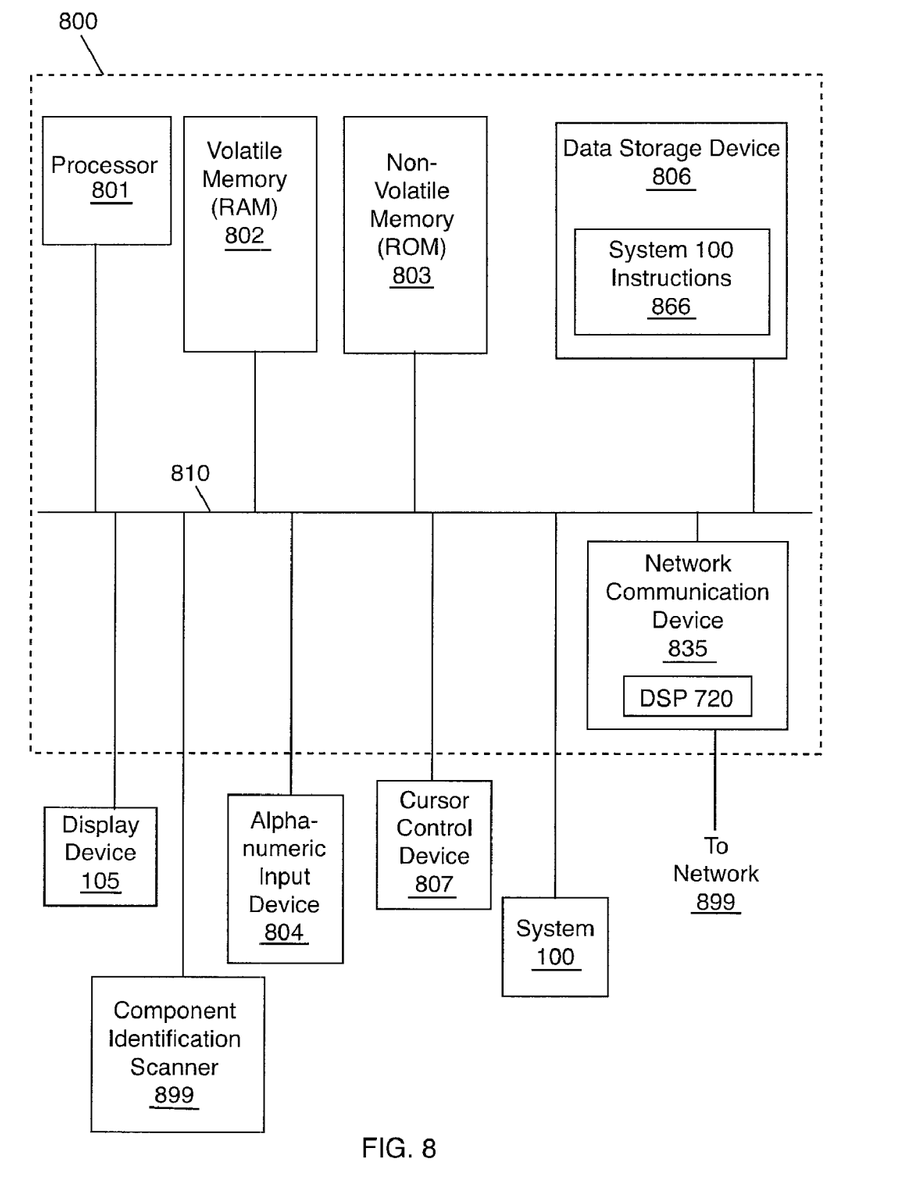
FIG. 8 is a block diagram of a computer system for controlling mechanisms, devices and processes associated with embodiments of the present invention.

FIG. 8 is a block diagram illustrating an exemplary computer system 800 that can be used in accordance with embodiments of the present invention. It is noted that computer system 800 can be nearly any type of computing system or electronic computing device including, but not limited to, a server computer, a desktop computer, a laptop computer, or other portable electronic device. Within the context of the present invention, certain discussed processes, procedures, and steps are realized as a series of instructions (e.g., a software program) that reside within computer system memory units of computer system 800 and which are executed by a processor(s) of computer system 800, in one embodiment. When executed, the instructions cause computer system 800 to perform specific actions and exhibit specific behavior which is described in detail herein.

Computer system 800 of FIG. 8 comprises an address/data bus 810 for communicating information, one or more central processors 801 coupled to bus 810 for processing information and instructions. Central processor(s) 801 can be a microprocessor or any alternative type of processor. Computer system 800 also includes a computer usable volatile memory 802, e.g., random access memory (RAM), static RAM (SRAM), dynamic RAM (DRAM), synchronous dynamic RAM (SDRAM), double data rate RAM (DDR RAM), etc., coupled to bus 810 for storing information and instructions for processor(s) 801. Computer system 800 further includes a computer usable non-volatile memory 803, e.g., read only memory (ROM), programmable ROM, electronically programmable ROM (EPROM), electrically erasable ROM (EEPROM), flash memory (a type of EEPROM), etc., coupled to bus 810 for storing static information and instructions for processor(s) 801. In an embodiment, non-volatile memory 803 can be removable.

System 800 also includes one or more signal generating and receiving devices, e.g., signal input/output device(s) 835 coupled to bus 810 for enabling computer 800 to interface with other electronic devices via a network, e.g., network 899 (not shown). Communication interface 835 can include wired and/or wireless communication functionality. For example, in one embodiment, communication interface 835 is an Ethernet adapter, but can alternatively be one of a number of well known communication standards and protocols, e.g., a parallel port, a serial communication port, a FireWire (IEEE 1394) interface, a Universal Serial Bus (USB), a small computer system interface (SCSI), an infrared (IR) communication port, a Bluetooth wireless communication adapter, a broadband connection, and the like. In another embodiment, a digital subscriber line (DSL) can be implemented as signal input/output device 835. In such an instance, communication interface 835 may include a DSL modem. Network 899 may be, but is not limited to, a client/server network, an intranet network, an internet network, or any other network enabling intercommunication between two or more computer systems.

Still referring to FIG. 8, network communication device 835, in an embodiment, includes an optional digital signal processor (DSP) 820 for processing data to be transmitted or data that are received via network communication device 835. Alternatively, processor 801 can perform some or all of the functions performed by DSP 820.

Computer 800 of FIG. 8 can also include one or more computer usable data storage device(s) 806 coupled to bus 110 for storing instructions and information, in one embodiment of the present invention. In one embodiment, data storage device 806 can be a magnetic storage device, e.g., a hard disk drive, a floppy disk drive, a zip drive, or other magnetic storage device. In another embodiment, data storage device 806 can be an optical storage device, e.g., a CD (compact disc), a DVD (digital versatile disc), or other alternative optical storage device. Alternatively, any combination of magnetic, optical, and alternative storage devices can be implemented, e.g., a RAID (random array of independent disks) configuration. It is noted that data storage device 806 can be located internal and/or external of system 800 and communicatively coupled with system 800 utilizing wired and/or wireless communication technology, thereby providing expanded storage and functionality to system 800. It is further noted that nearly any portable electronic device can also be communicatively coupled with system 800 via utilization of wired and/or wireless technology, thereby expanding the functionality of system 800. In an embodiment of the present invention, instructions, specifications, and tolerances related to components used in conjunction with processes for component cover screw removal are stored in storage device 806, e.g., instructions 866. Although instructions 866 are shown wholly disposed in storage device 806, instructions 866 may alternatively be stored in volatile memory 802, non-volatile memory 803, or in a combination of memory 802, memory 802 and storage device 806.

System 800 can also include one or more optional display devices 805 coupled to bus 810 for displaying video, graphics, and/or alphanumeric characters. It is noted that display device 805 can be a CRT (cathode ray tube), a thin CRT (TCRT), a liquid crystal display (LCD), a plasma display, a field emission display (FED), a television or any other display device or combinations of display devices suitable for displaying video, graphics, and alphanumeric characters recognizable to a user. In an embodiment of the present invention, display device 805 may be a touch screen display device, e.g., touch screen 105 of FIG. 1.

Computer system 800 of FIG. 8 further includes an optional alphanumeric input device 804 coupled to bus 810 for communicating information and command selections to processor(s) 801, in one embodiment. Alphanumeric input device 804 is coupled to bus 810 and includes alphanumeric and function keys. Also included in computer 100 is an optional cursor control device 808 coupled to bus 810 for communicating user input information and command selections to processor(s) 801. Cursor control device 808 can be implemented using a number of well known devices such as a mouse, a trackball, a track pad, a joy stick, a optical tracking device, a touch screen, etc. It is noted that a cursor can be directed and/or activated via input from alphanumeric input device 804 using special keys and key sequence commands. It is further noted that directing and/or activating the cursor can be accomplished by alternative means, e.g., voice activated commands, provided computer system 800 is configured with such functionality.

In an alternative embodiment of the present embodiment, system 800 may be configured with a component identification scanner 899 for identifying each component subjected to a cover screw removal process in accordance with embodiments of the present invention. Each component, e.g., a hard disk drive 710, may have a unique identifier disposed thereon. Types of unique identifiers can include, but which is not limited to, bar codes, RFID, or other means of uniquely identifying each component. Scanner 899 may be configured to implement a cover screw removal process appropriate for the unique identifier present on a component.

Figure 9:
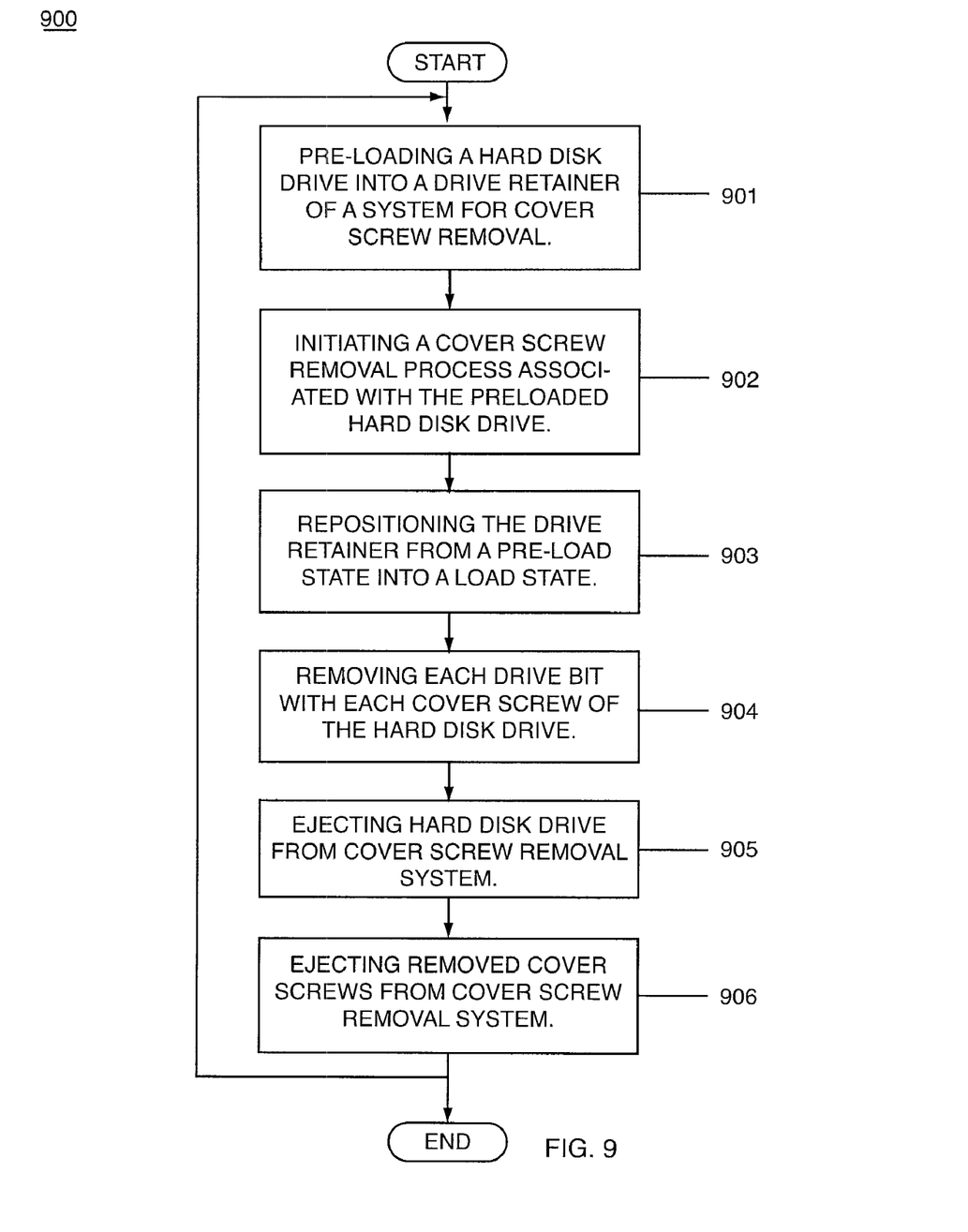
FIG. 9 is a flowchart of a method for ganged hard disk drive cover screw removal in accordance with an embodiment of present invention.

FIG. 9 is a flowchart of a process 900 for component cover screw removal, in accordance with an embodiment of the present invention. FIG. 9 is a flow chart of a process 900 in which particular operations are performed in accordance with an embodiment of the present invention for component to component mounting. Although specific operations are disclosed in process 900, such operations are exemplary. That is, the present invention is well suited to performing various other operations or variations of the operations recited in FIG. 9. Within the present embodiment, it should be appreciated that the operations of process 900 may be performed by software, by hardware, by an assembly mechanism, through human interaction, or by any combination of software, hardware, assembly mechanism, and human interaction.

Process 900 for component cover screw removal will be described with reference to components and devices shown in FIGS. 1-5 and 6A-C in accordance with embodiments of the present invention.

In operation 901 of process 900, a component device, e.g., hard disk drive 710 of FIG. 7 is received in a component retainer of system 100, e.g., nest bracket 216 of nest 206 of FIG. 3, in an embodiment of the present invention. For purposes of the present invention, a component device disposed in nest bracket 216 is termed in a pre-load position. In an embodiment of the present invention, the received hard disk drive 710 is oriented such that cover screws, e.g., cover screws 706 of FIG. 7, are facing toward a retention mechanism remover assembly, e.g., assembly 310 of FIG. 3.

In an embodiment of the present invention, hard disk drive 710 may be manually placed onto nest bracket 216. Alternatively, hard disk drive 710 may be automatedly placed onto nest bracket 216.

In an embodiment of the present invention, an identifier on the hard disk drive 710, e.g., a bar code identifier, is scanned, via a scanner (not shown), into system 100 prior to placing the hard disk drive into nest bracket 216 of nest 206. In an embodiment, the hard disk drive identifier is manually scanned. Alternatively, scanning may be performed automatedly. In yet another embodiment, an alternative hard disk drive identifier, e.g., a model number, a serial number, may be operator inputted into computer system 100, In operation 902 of process 900, a cover screw removal process commences subsequent to activating the cover screw removal system 100, in accordance with embodiments of the present invention. In an embodiment, an operator may press a start button, e.g., start button 108 of FIG. 1, to initiate the cover screw removal process. Alternatively, automated activation may be implemented.

In operation 903 of process 900, system 100 initially lowers hard disk drive 710 from a pre-load position to a load position, such that nest bracket 216 is proximal to cover screw removers 406 of cover screw removal assembly 310, in an embodiment of the present invention. In the present embodiment, a load position refers to hard disk drive 710 securely retained in a temporary fixed position. In an embodiment, system 100 then elevates cover screw removal assembly 310 to contact hard disk drive 710. Subsequent to contact, system 100 rotates, at a slow speed and with minimal force (torque), each cover screw remover 406 (FIG. 4) so as to engage each drive bit 416 with each cover screw 706, in an embodiment of the present invention. In the context of embodiments of the present invention, to engage means full contact of each drive bit tip, e.g., drive bit tip 417 of FIG. 6A, drive bit tip 418 of FIG. 6B or drive bit tip 419 of FIGS. 6C, with each associated cover screw 706 present in hard disk drive 710.

In operation 904 of process 900, upon detected engagement of each bit driver 406 with each cover screw 706 of hard disk drive 710, as detected by bit sensor 506 of FIG. 5, system 100 rotates each bit driver 406 so as to loosen and remove each cover screw 706 from hard disk drive 710. Rotational speeds and applied force (torque) are controlled by specifications and cover screw removal instructions retrievably stored in computer system 800, e.g., instructions 866 in data storage device 806 as shown in FIG. 8. In an embodiment of the present invention, each bit driver 706 is synchronously rotated. In an embodiment of the present invention, the force applied (torque) at each bit driver 406 is analogous. In an alternative embodiment, force applied (torque) at each bit driver 406 may be different.

By virtue of hard disk drive 710 disposed in a load position, during cover screw removal there is an opposing force created by the threads of each cover screw 706, such that a downward force is applied to screw removal assembly 310 is generated by the rotation of cover screws 706. Accordingly, in an embodiment of the present invention, system 100 lowers screw removal assembly 310 proportionally to the force generated by rotation of cover screws 706. In an alternative embodiment, system 100 may be configured with a fixed cover screw removal assembly 310 and a position adjustable component retainer 206, such that retainer 206 is lowered and elevated via mechanism 226 (as indicated by arrow 246) of FIG. 2. In the alternative embodiment, as screw removal assembly 310 is in a fixed position, during rotation of cover screws 706, system 100 elevates component retainer 206 during cover screw removal.

With reference still to operation 904 of process 900, it is particularly noted that concurrent with rotation of each bit driver 406, system 100 activates a particulate matter evacuation system, e.g., vacuum system 106 of FIG. 1, in an embodiment of the present invention. Activation of vacuum system 106 removes particulate matter that may be present near and/or within each cover screw 706 of hard disk drive 710. Vacuum system 106 additionally provides force for retaining each cover screw 706 on each bit driver tip 416. It is further noted that by inverting hard disk drive 710 within receiver bracket 216, embodiments of the present invention utilize gravitational forces to aide in the retention of cover screws on the drive bit tips as well as to aide in the removal of particulate matter that may be present.

In operation 905 of process 900, upon cover screw 706 removal completion, an operator may remove hard disk drive 710 from nest bracket 216, in an embodiment of the present invention. In an alternative embodiment, hard disk drive 710 may be automatedly removed.

In operation 906 of process 900, cover screws 706 retained upon drive bit tips 416 are operator removed from screw removal assembly 310. In an alternative embodiment of the present invention, cover screws 706 retained upon drive bit tips 416 are automatedly removed.

It is noted that subsequent to completion of operations 905 and 906, process 900 may be terminated or process 900 may be restarted, e.g., returns to operation 901 and is repeated.

Embodiments of the present invention, in the various presented embodiments, provide a system and method for ganged cover screw removal.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for removal of retentive mechanisms retaining a cover of a component device, said apparatus comprising:

a structure including a particulate matter evacuating device and coupled with said structure;

a component device positioner coupled to said structure;

a plurality of retentive mechanism removers coupled with said structure, wherein each of said plurality of retentive mechanism removers are configured for interoperability with each retention mechanism retaining a cover of a component device having a plurality of retention mechanisms disposed therein; and a drive mechanism, coupled with said structure, for rotation of each of said plurality of retentive mechanism removers, causing removal of said each retention mechanism retaining a cover of said component device.

2. The apparatus as recited in claim 1 wherein said particulate matter evacuating device is coupled to each of said plurality of retentive mechanism removers.

3. The apparatus as recited in claim 1 further comprising an elevating mechanism for orienting said plurality of retentive mechanism removers in an engagement position.

4. The apparatus as recited in claim 1 further comprising a bit sensor coupled with each of said plurality of retentive mechanism removers.

5. The apparatus as recited in claim 4 wherein said bit sensor detects engagement of each of said plurality of retention mechanism removers with each of said plurality of retentive mechanism removers disposed in said component device.

6. The apparatus as recited in claim 5 wherein said bit sensor causes synchronous rotation of each of said plurality of retentive mechanism removers, said synchronous rotation subsequent to engagement detection.

7. A system for cover screw removal comprising:

means for retaining a component device in an apparatus and upon which a cover screw removal process is to be performed;

means for engaging a plurality of drive bits with a plurality of cover screws of said component device, said means for engaging coupled with said apparatus; and means for rotating said plurality of drive bits subsequent to said engaging, said means for rotating coupled with said apparatus.

8. The system as recited in claim 7 further comprising:

means for removing particulate matter, said means for removing coupled with said apparatus.

9. The system as recited in claim 7 further comprising:

means for coupling each drive bit with said means for removing.

10. The system as recited in claim 7 further comprising:

means for detecting engagement of each drive bit in said plurality of drive bits with said plurality of cover screws of said component device, said means for detecting coupled with said means for engaging.

11. The system as recited in claim 7 wherein said means for rotating further comprising:

means for synchronous rotation of each drive bit in said plurality of drive bits.

12. The system as recited in claim 7 wherein said means for retaining further comprises:

means for alleviating opposing force generated during rotation of said plurality of cover screw during said removal.

* * * * *